(12) United States Patent
Mathrubutham et al.

(10) Patent No.: US 8,140,348 B2
(45) Date of Patent: Mar. 20, 2012

(54) METHOD, SYSTEM, AND PROGRAM FOR FACILITATING FLOW CONTROL

(75) Inventors: Ramani Mathrubutham, Milpitas, CA (US); Adwait Sathye, Sunnyvale, CA (US); Chendong Zou, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 1630 days.

(21) Appl. No.: 10/768,285

(22) Filed: Jan. 30, 2004

(65) Prior Publication Data
US 2005/0171789 A1 Aug. 4, 2005

(51) Int. Cl.
*G06Q 10/00* (2012.01)

(52) U.S. Cl. ...... 705/1.1; 705/7.11; 705/7.22; 705/7.27; 710/39; 710/52; 710/53; 710/54; 710/55; 710/56; 710/57

(58) Field of Classification Search ............ 710/39, 710/52–57
See application file for complete search history.

(56) References Cited

U.S. PATENT DOCUMENTS

| | | | |
|---|---|---|---|
| 4,648,031 A | 3/1987 | Jenner | |
| 4,703,481 A | 10/1987 | Fremont | |
| 4,878,167 A | 10/1989 | Kapulka et al. | |
| 5,410,672 A | 4/1995 | Sodek, Jr. et al. | |
| 5,440,691 A | 8/1995 | Carrafiello et al. | |
| 5,566,337 A | 10/1996 | Szymanski et al. | |
| 5,692,156 A | 11/1997 | Bahls et al. | |
| 5,712,971 A | 1/1998 | Stanfill et al. | |
| 5,870,605 A | 2/1999 | Bracho et al. | |
| 5,938,775 A | 8/1999 | Damani et al. | |
| 6,014,673 A | 1/2000 | Davis et al. | |
| 6,044,419 A | 3/2000 | Hayek et al. | |
| 6,070,202 A | 5/2000 | Minkoff et al. | |
| 6,182,086 B1 | 1/2001 | Lomet et al. | |
| 6,249,800 B1* | 6/2001 | Aman et al. | 718/105 |
| 6,285,601 B1 | 9/2001 | Smith | |
| 6,292,856 B1* | 9/2001 | Marcotte | 710/39 |
| 6,308,237 B1 | 10/2001 | Strongin et al. | |
| 6,321,234 B1 | 11/2001 | Debrunner | |
| 6,336,119 B1 | 1/2002 | Banavar et al. | |

(Continued)

FOREIGN PATENT DOCUMENTS
GB 2354913 A 4/2001

(Continued)

OTHER PUBLICATIONS
Title: Distributed bottleneck control for repetitive production systems. Author(s): Banaszak, Z. Journal: Journal of Intelligent Manufacturing, vol. 8, No. 5, pp. 415-424. Publisher: Chapman & Hall. Country of Publication: UK. Publication Date: Oct. 1997.*

(Continued)

*Primary Examiner* — John Weiss
*Assistant Examiner* — Fathi Abdelsalam
(74) *Attorney, Agent, or Firm* — Janaki K. Davda; Konrad Raynes & Victor LLP

(57) ABSTRACT

Disclosed is a technique for flow control. It is detected that a work request is being transferred to an in-memory structure. A maximum limit is compared with a number of work requests stored in the in-memory structure. If the number of work requests stored in the in-memory structure equals the maximum limit, a notification is sent that indicates that additional work requests are not to be sent.

24 Claims, 9 Drawing Sheets

U.S. PATENT DOCUMENTS

| | | | |
|---|---|---|---|
| 6,351,780 | B1 | 2/2002 | Ecclesine |
| 6,493,826 | B1 | 12/2002 | Schofield et al. |
| 6,839,817 | B2 | 1/2005 | Hyde, II et al. |
| 6,898,609 | B2 | 5/2005 | Kerwin |
| 6,970,921 | B1 | 11/2005 | Wang et al. |
| 7,065,537 | B2 | 6/2006 | Cha et al. |
| 7,130,957 | B2 | 10/2006 | Rao |
| 7,210,001 | B2 | 4/2007 | Frey et al. |
| 2002/0161859 | A1 | 10/2002 | Willcox et al. |
| 2002/0194244 | A1 | 12/2002 | Raventos |
| 2004/0165609 | A1* | 8/2004 | Herbst et al. ................. 370/412 |
| 2004/0215998 | A1 | 10/2004 | Buxton et al. |
| 2006/0004649 | A1 | 1/2006 | Singh |

FOREIGN PATENT DOCUMENTS

| | | | |
|---|---|---|---|
| JP | 2000332792 | A | 11/2000 |
| SU | 491980 | | 3/1974 |
| SU | 0491980 | T | 3/1974 |

OTHER PUBLICATIONS

U.S. Appl. No. 12/047,238, filed Mar. 12, 2008, entitled "System and Program for Buffering Work Requests", invented by R. Mathrubutham, A. Sathye, & C. Zho, 36 pp.

U.S. Patent Application entitled "Method, System, and Program for System Recovery," by P. Ahuja, R. Mathrubutham, A.B. Sathye and C. Zou, filed Jan. 30, 2004.

U.S. Patent Application entitled *Method, System, and Program for Buffering Work Requests*, by R. Mathrubutham, A.B. Sathye and C. Zou, filed Jan. 30, 2004.

Amendment 1, Dec. 7, 2006, for U.S. Appl. No. 10/768,581, Total 11 pp.

Amendment 1, Jan. 17, 2008, for U.S. Appl. No. 10/768,328, Total 10 pp.

Amendment 2, May 8, 2007, for U.S. Appl. No. 10/768,581, Total 17 pp.

Amendment 3, Jun. 27, 2008, for U.S. Appl. No. 10/768,328, Total 9 pp.

Amendment 4, Feb. 9, 2009, for U.S. Appl. No. 10/768,328, Total 8 pp.

Amendment 5, Jun. 3, 2009, for U.S. Appl. No. 10/768,328, Total 9 pp.

Final Office Action 1, Mar. 8, 2007, for U.S. Appl. No. 10/768,581, Total 12 pp.

Final Office Action 1, Mar. 20, 2008, for U.S. Appl. No. 10/768,328, Total 14 pp.

Notice of Allowance 1, Aug. 9, 2007, for U.S. Appl. No. 10/768,581, Total 12 pp.

Notice of Allowance 1, Apr. 8, 2009, for U.S. Appl. No. 12/047,238, Total 14 pp.

Notice of Allowance 1, Nov. 13, 2008, for U.S. Appl. No. 10/768,328, Total 12 pp.

Notice of Allowance 2, Dec. 13, 2007, for U.S. Appl. No. 10/768,581, Total 16 pp.

Notice of Allowance 2, Sep. 4, 2009, for U.S. Appl. No. 10/768,328, Total 4 pp.

Office Action 1, Sep. 8, 2006, for U.S. Appl. No. 10/768,581, Total 12 pp.

Office Action 1, Oct. 17, 2007, for U.S. Appl. No. 10/768,328, Total 10 pp.

Office Action 3, Mar. 3, 2009, for U.S. Appl. No. 10/768,328, Total 7 pp.

Supplemental Amendment 2, Jan. 28, 2008, for U.S. Appl. No. 10/768,328, Total 9 pp.

\* cited by examiner

US 8,140,348 B2

METHOD, SYSTEM, AND PROGRAM FOR FACILITATING FLOW CONTROL

BACKGROUND OF THE INVENTION

1. Field of the Invention

The present invention is related to facilitating flow control.

2. Description of the Related Art

The term "workflow" may be used to describe tasks and data for business processes. The data, for example, may relate to organizations or people involved in a business process and required input and output information for the business process. A workflow automation product allows creation of a workflow model to manage business processes. A workflow engine is a component in a workflow automation program that understands the tasks of each business process in the workflow and determines whether the business process is ready to move to the next task.

A publish-subscribe pattern is a common pattern in distributed applications and describes a pattern in which a publisher (e.g., an application program) generates work requests to be processed by one or more subscribers (e.g., business processes), for example, as part of a work flow. The subscribers that receive the work requests are those that are interested in the work requests and that have registered with the publisher to receive the work requests of interest.

A work request may be described as a business object request because the work request is processed by a business process. For example, a work request may provide data (e.g., employee name and social security number) and a description of what is to be done (e.g., creating, deleting, or updating an entry in a data store).

The publisher may dispatch work requests to an intermediary application program that stores the work requests in queues for each subscriber, and each subscriber retrieves the work requests from an associated queue. Since the intermediary application program holds work requests in each queue until the work requests are retrieved by subscribers, sometimes, a very slow subscriber may not retrieve work requests at a fast rate, leaving many work requests in the queue. This may lead to the queue running out of entries for storing new work requests for that subscriber.

That is, one problem with the publisher-subscriber pattern is the inability to control the delivery of work requests from the publisher so that a queue does not overflow when a subscriber is slow to retrieve work requests from the queue.

Thus, there is a need in the art for an improved technique for processing work requests for a system using a publish-subscribe pattern.

SUMMARY OF THE INVENTION

Provided are a method, system, and program for flow control. It is detected that a work request is being transferred to an in-memory structure. A maximum limit is compared with a number of work requests stored in the in-memory structure. If the number of work requests stored in the in-memory structure equals the maximum limit, a notification is sent that indicates that additional work requests are not to be sent.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Implementations of the invention facilitate flow control by controlling the state of the publishers based on the state of one or more subscribers. For example, if a subscriber cannot process additional events, one or more publishers are notified to stop sending work requests. That is, the publishers are controlled so that the publishers do not deliver more work requests than can be stored. This may also be thought of as "throttling" the rate of the work requests delivered by the publisher to match the retrieval rate of the subscribers.

Figure 1A:
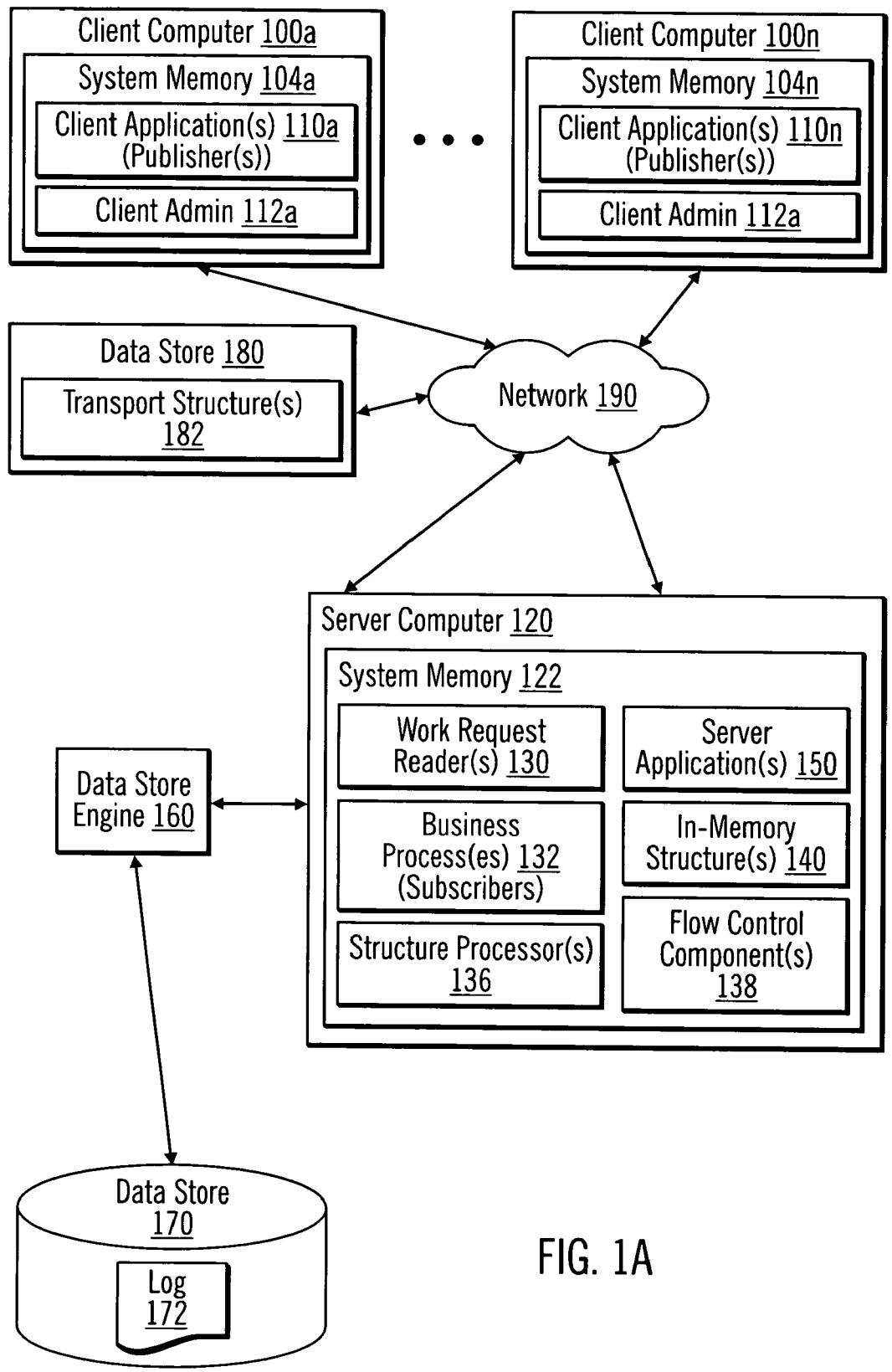
FIG. 1A illustrates, in a block diagram, a computing environment in accordance with certain implementations of the invention.

FIG. 1A illustrates, in a block diagram, a computing environment in accordance with certain implementations of the invention. One or more client computers $100a \ldots 100n$ are connected via a network 190 to a server computer 120. For ease of reference, the designations of "a" and "n" after reference numbers (e.g., $100a \ldots 110n$) are used to indicate one or more elements (e.g., client computers). The client computers $100a \ldots 100n$ may comprise any computing device known in the art, such as a server, mainframe, workstation, personal computer, hand held computer, laptop telephony device, network appliance, etc. The network 190 may comprise any type of network, such as, for example, a Storage Area Network (SAN), a Source Area Network (LAN), Wide Area Network (WAN), the Internet, an Intranet, etc.

Each client computer $100a \ldots 100n$ includes system memory $104a \ldots 104n$, respectively, which may be implemented in volatile and/or non-volatile devices. One or more client applications $110a \ldots 110n$ and client admin applications $112a \ldots 112n$ may execute in the system memory $104a \ldots 104n$, respectively. The client applications $110a \ldots 110n$ may generate and submit work requests in the form of messages to the server computer 120 for execution. The client admin applications $112a \ldots 112n$ perform administrative functions.

The server computer 120 includes system memory 122, which may be implemented in volatile and/or non-volatile devices. A data store engine 160 is connected to the server computer 120 and to data store 170.

One or more work request readers 130, one or more business processes 132, one or more structure processors 136, and one or more flow control components 138 execute in the system memory 122. Additionally, one or more server applications 150 execute in system memory 122. One or more in-memory structures 140 (e.g., in-memory queues) may be stored in system memory 122. In certain implementations of the invention, there is one in-memory structure 140 associated with each business processes 132, and one structure processor 136 associated with each in-memory structure 140.

One or more transport structures 182 (e.g., queues) may be stored in a data store 180 connected to network 190. In certain implementations of the invention, there is one transport structure 182 associated with each business process 132. The transport structure 182 may be, for example, a Message Queue ("MQ") available from International Business Machines Corporation, a Common Object Request Broker Architecture (CORBA) structure, or a JAVA® Message Service (JMS) structure. In certain implementations of the invention, the transport structure 182 may be persistent.

In certain implementations of the invention, such as in workflow systems, the client applications 110a . . . 110n may be described as "publishers", while the business processes 132 may be described as "subscribers".

The work requests may be stored in both in-memory structures 140 and in transport structures 182 corresponding to the business processes 132 that are to process the work requests. The work request reader 130 retrieves a work request from a transport structure 182 associated with a business process 132 that is to execute the work request, and forwards the work request to the appropriate business process 132.

The log 172 provides information about work requests (e.g., a work request key, a work request ordering identifier, and a structure identifier) and the state of the work requests (e.g., whether a work request was in progress when a system (e.g., server computer 120) failure occurred).

Although a single data store 170 is illustrated for ease of understanding, data in data store 170 may be stored in multiple data stores at server computer 120 and/or other computers connected to server computer 120.

The data store 170 may comprise an array of storage devices, such as Direct Access Storage Devices (DASDs), Just a Bunch of Disks (JBOD), Redundant Array of Independent Disks (RAID), virtualization device, etc.

Figure 1B:
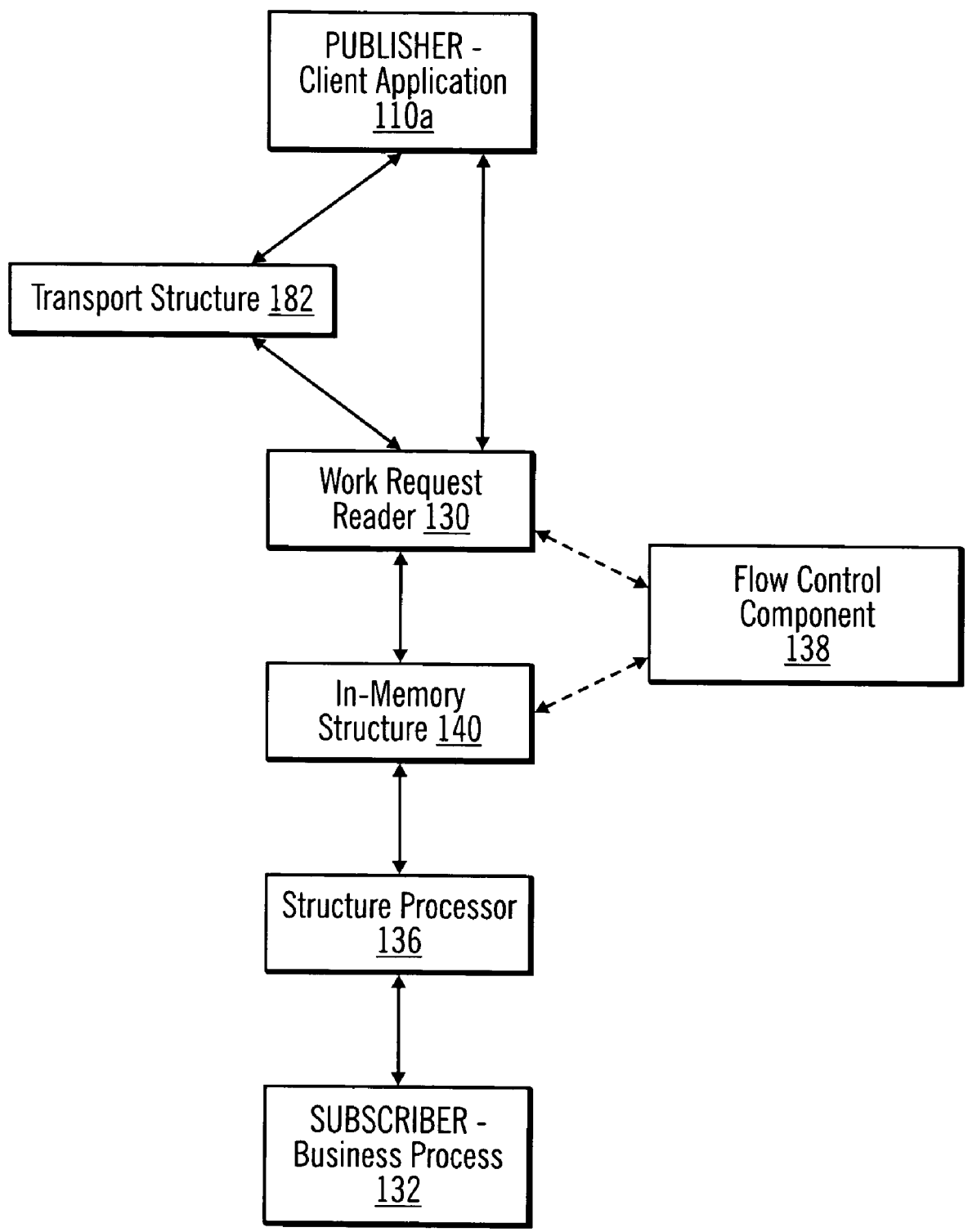
FIG. 1B illustrates, in a block diagram, further details of a computing environment in accordance with certain implementations of the invention.

FIG. 1B illustrates, in a block diagram, further details of a computing environment in accordance with certain implementations of the invention. In certain implementations, one client application 130 ("publisher"), one transport structure 182, one work request reader 130, one in-memory structure 140, one structure processor 136, and one business process 132 ("subscriber") are associated with each other. In certain alternative implementations, a business process 132 may receive work requests from multiple client applications 110.

In the illustration of FIG. 1B, the client application 110a produces work requests that are destined for the business process 132. The client application 110a may also communicate with the work request reader 130, for example, for administrative functions. In particular, the client application 110a sends work requests to the server computer 120 by storing the work requests in transport structures 182, where one transport structure 182 corresponds to one business process 132. The work request reader 130 retrieves work requests from the transport structure 182 and stores them in the in-memory structure 140 for the business process 132. The structure processor 136 retrieves work requests from the in-memory structure 140 and forwards the work requests to the business process 132 for processing. After completing a work request, a business process 132 removes the work request from the appropriate transport structure 182 and performs other processing to clean up the transport structure 182. Additionally, a flow control component 138 monitors work requests being transferred by the work request reader 130 into the in-memory structure 140 and work requests removed from the in-memory structure 140. The flow control component 138 may assist in controlling the flow of work requests.

Figure 1C:
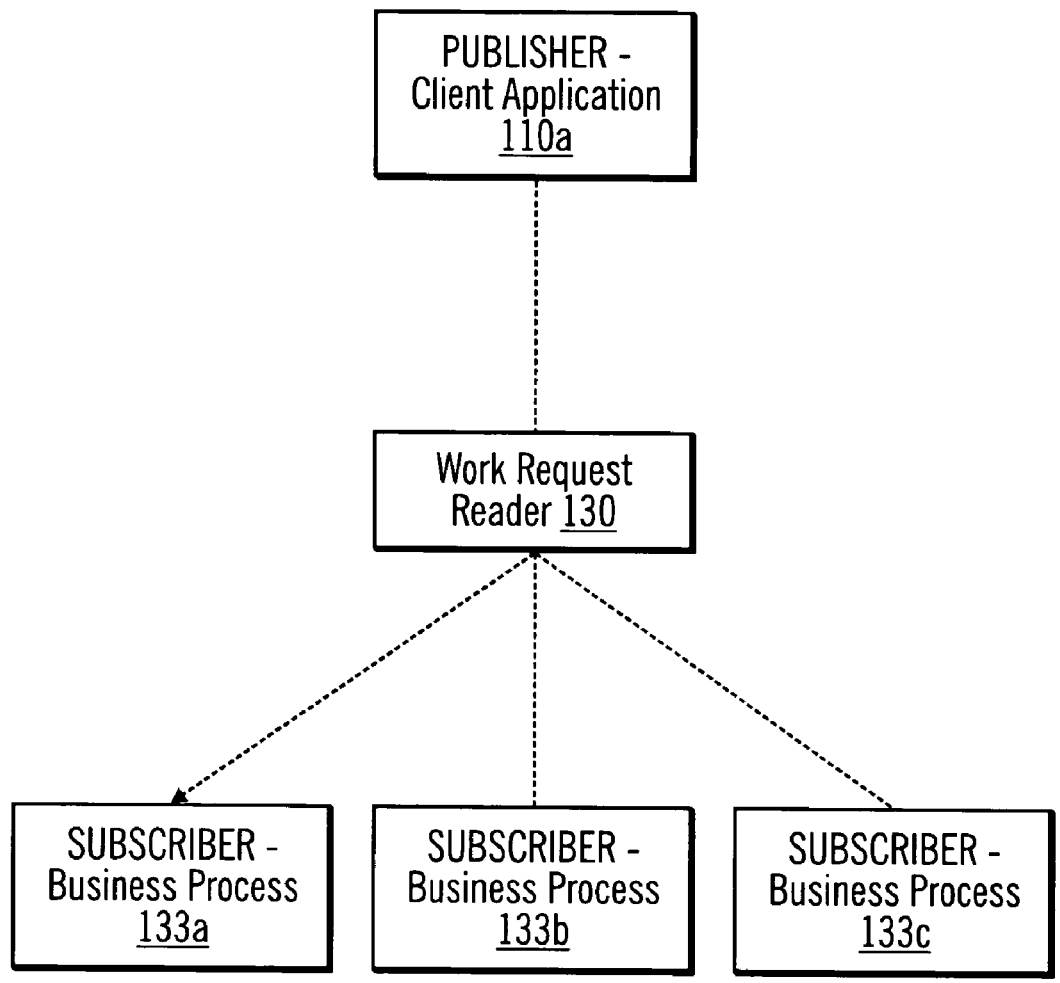
FIG. 1C illustrates, in a block diagram, yet further details of a computing environment in accordance with certain implementations of the invention.

FIG. 1C illustrates, in a block diagram, yet further details of a computing environment in accordance with certain implementations of the invention. In particular, in FIG. 1C, a single client application 110a may send work requests that are processed by a single work request reader 130 for multiple business processes 133a, 133b, 133c.

Figure 2A:
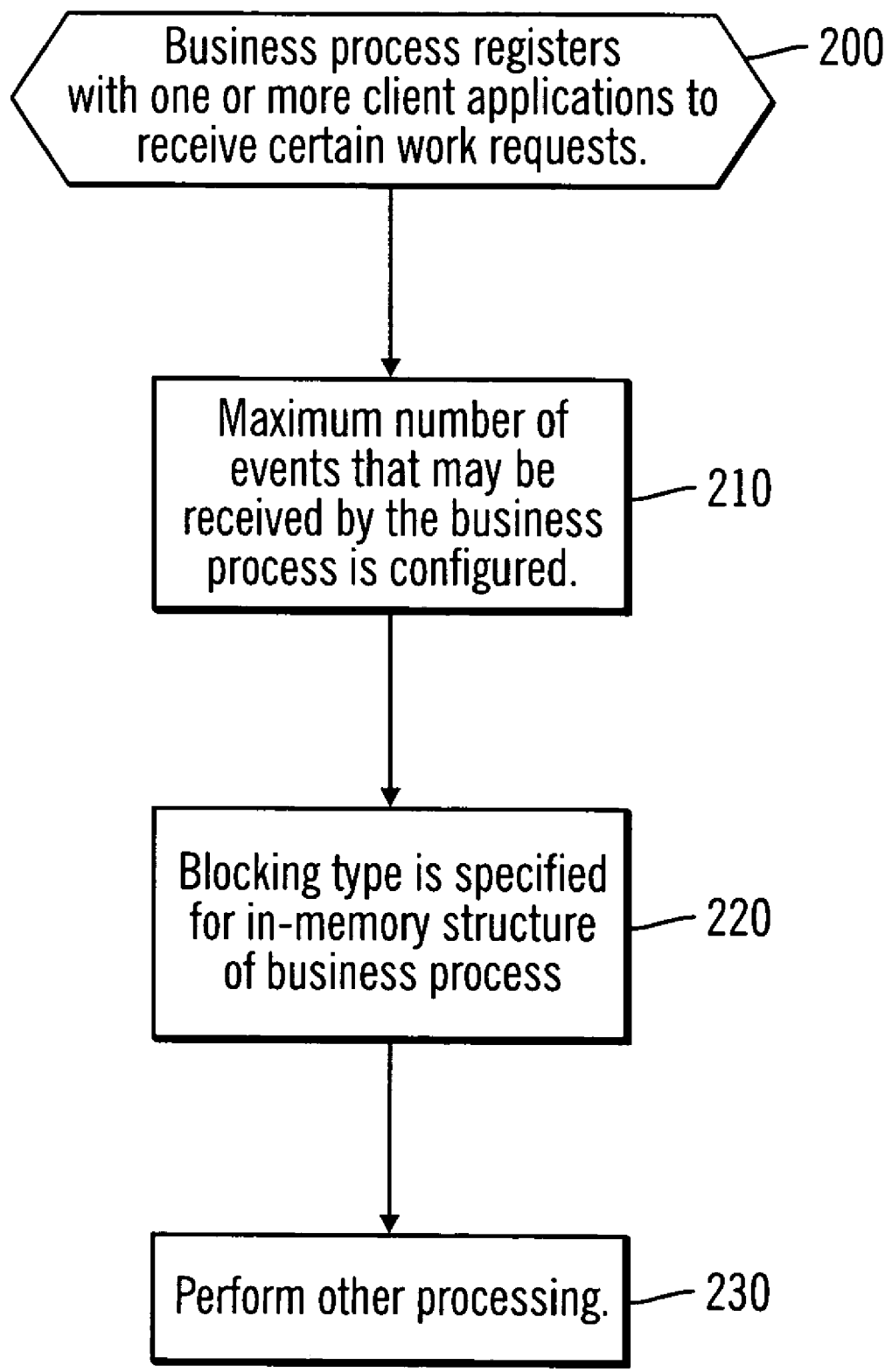
FIG. 2A illustrates logic implemented in a business process in accordance with certain implementations of the invention.

FIG. 2A illustrates logic implemented in a business process 132 in accordance with certain implementations of the invention. Control begins at block 200 with the business process 132 registering with one or more client applications 110a . . . 110n for certain types of work requests. In certain implementations, each work request includes a type field. Then, when a work request is generated by a client application 110a . . . 110n, the type of the work request is determined, the business processes 132 that registered for that type of work request are determined, and the work request is sent, by the client application 110a . . . 110n, to the transport structures 182 for the determined business processes 132. In alternative implementations, work requests and business processes 132 may be associated using other techniques (e.g., all business processes 132 receive all work requests and process the desired ones).

In block 210, the business process 132 is configured for a maximum number of work requests that may be may be stored by the business process at any given time, and this maximum number is also referred to as a "maximum limit." In certain implementations, a user, such as a system administrator, sets the maximum limit. In certain implementations, the maximum limit is equivalent to the number of work requests that may be stored in an in-memory structure 140 for the business process 132. In block 220, a blocking type is specified for the in-memory structure 140 for the business process 132. In block 230, other processing may occur.

In certain implementations, a blocking type may be associated with an in-memory structure 140 for a business process 132. The blocking type is set to a first value (e.g., "blocking") to indicate that a client application 110a . . . 110n should be blocked from sending additional work requests when a maximum limit is reached for a business process. The blocking type is set to a second value (e.g., "non-blocking") to indicate that a client application 110a . . . 110n should not be blocked from sending additional work requests when a maximum limit is reached for a business process.

Figure 2B:
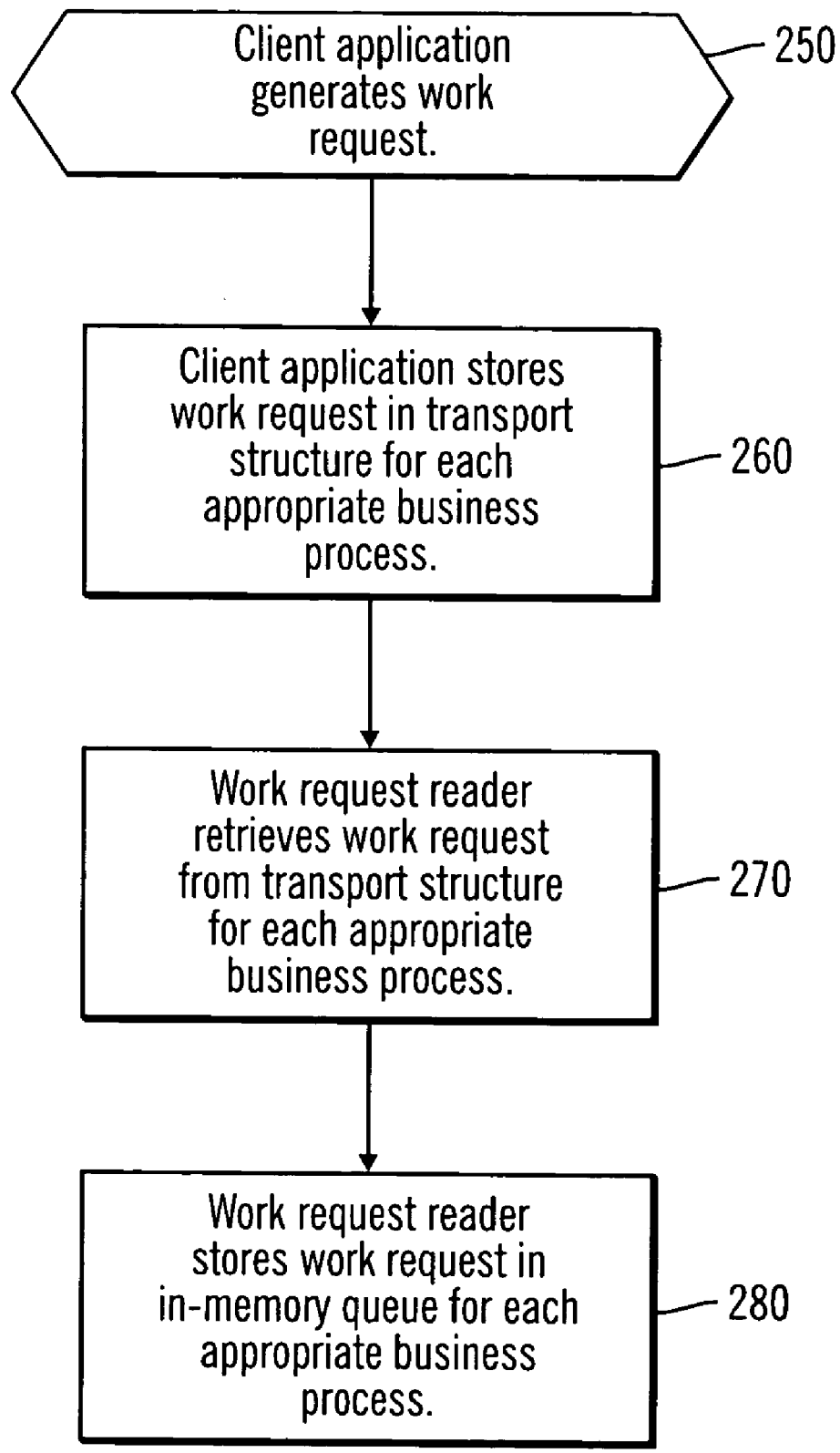
FIG. 2B illustrates logic implemented for moving work requests in accordance with certain implementations of the invention.

FIG. 2B illustrates logic implemented for moving work requests in accordance with certain implementations of the invention. Control begins in block 250 with a client application (e.g., 110a) generating a work request. In block 260, the client application 110a . . . 110n stores the work request in a transport structure 182 for the associated business process 132. If more than one business process 132 is to process the same work request, then the client application 110a . . . 110n stores the work request in the transport structure 182 for each appropriate business process 132. In block 270, the work request reader 130 retrieves the work request from the transport structure 182 for the associated business process. In block 280, the work request reader 130 stores the work request in an in-memory structure 140 for the associated business process 132.

Figure 3A:
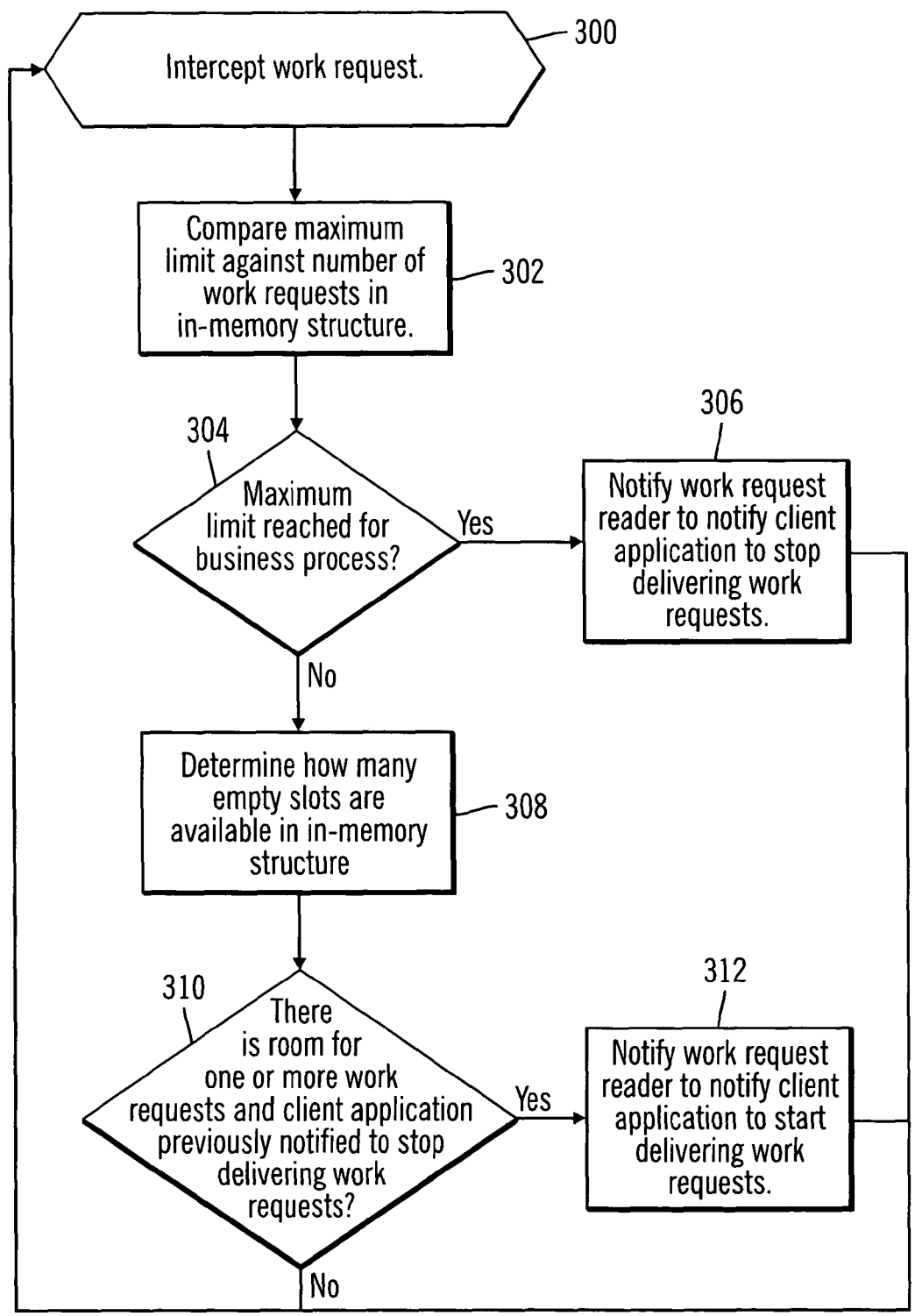
FIG. 3A illustrates logic implemented in a flow control component in accordance with certain implementations of the invention.

FIG. 3A illustrates logic implemented in a flow control component 138 in accordance with certain implementations of the invention. Control begins in block 300 with the flow control component 138 "intercepting" a work request transferred by the work request reader 130. The term "intercepting" describes monitoring by the flow control component 138 and detecting that the work request is being transferred into or out of an in-memory structure 140. The processing of block 300 may occur periodically. In certain implementations, the work request reader 130 registers with the flow control component 138 so that the flow control component 138 can monitor work requests being transferred by the work request reader 130. In block 302, the flow control component 138 compares the maximum limit against the number of work requests in the in-memory structure 140. In block 304, if the maximum limit has been reached, processing continues to block 306, otherwise, processing continues to block 308.

In block 306, the flow control component 138 notifies the work flow mover 130 to notify the client application 110a . . . 110n that sent the work request that was intercepted to stop sending work requests. In certain implementations, the work request includes an identifier identifying the client application 110a . . . 110n by which the work request was generated. From block 304, processing loops back to block 300. In certain implementations, a notification flag may be set for each business process. In this case, in block 306, the notification is sent only if the notification flag is set to indicate that a notification is to be sent.

In block 308, the flow control component 138 determines how many empty slots for storing work requests are available in in-memory structure 140. In certain implementations, the flow control component 138 "intercepts" a work request transferred out of the in-memory structure 140 (i.e., detects that the work request is being transferred out of an in-memory structure 140). In block 302, if there is room for one or more work requests in the in-memory structure 140 and the client application 110a . . . 110n was previously notified to stop delivering work requests, processing continues to block 312, otherwise, processing loops back to block 300. In block 312, the flow control component 138 notifies the work flow mover 130 to notify the client application 110a . . . 110n that was previously notified to stop sending work requests to start sending work requests. Then, processing loops back to block 300.

For example, in certain implementations, if the maximum limit is 10 work requests, when the 11$^{th}$ work request is intercepted by the flow control component 138, the flow control component 138 notifies the client application to stop sending work requests. In certain alternative implementations, if the maximum limit is 10 work requests, when the 10$^{th}$ work request is intercepted by the flow control component 138, the flow control component 138 notifies the client application to stop sending work requests.

Thus, in certain implementations, as work requests beyond the maximum limit are sent by one or more client applications 110a . . . 110n to a business process 132, each of the client applications 110a . . . 110n are notified to stop sending work requests.

Figure 3B:
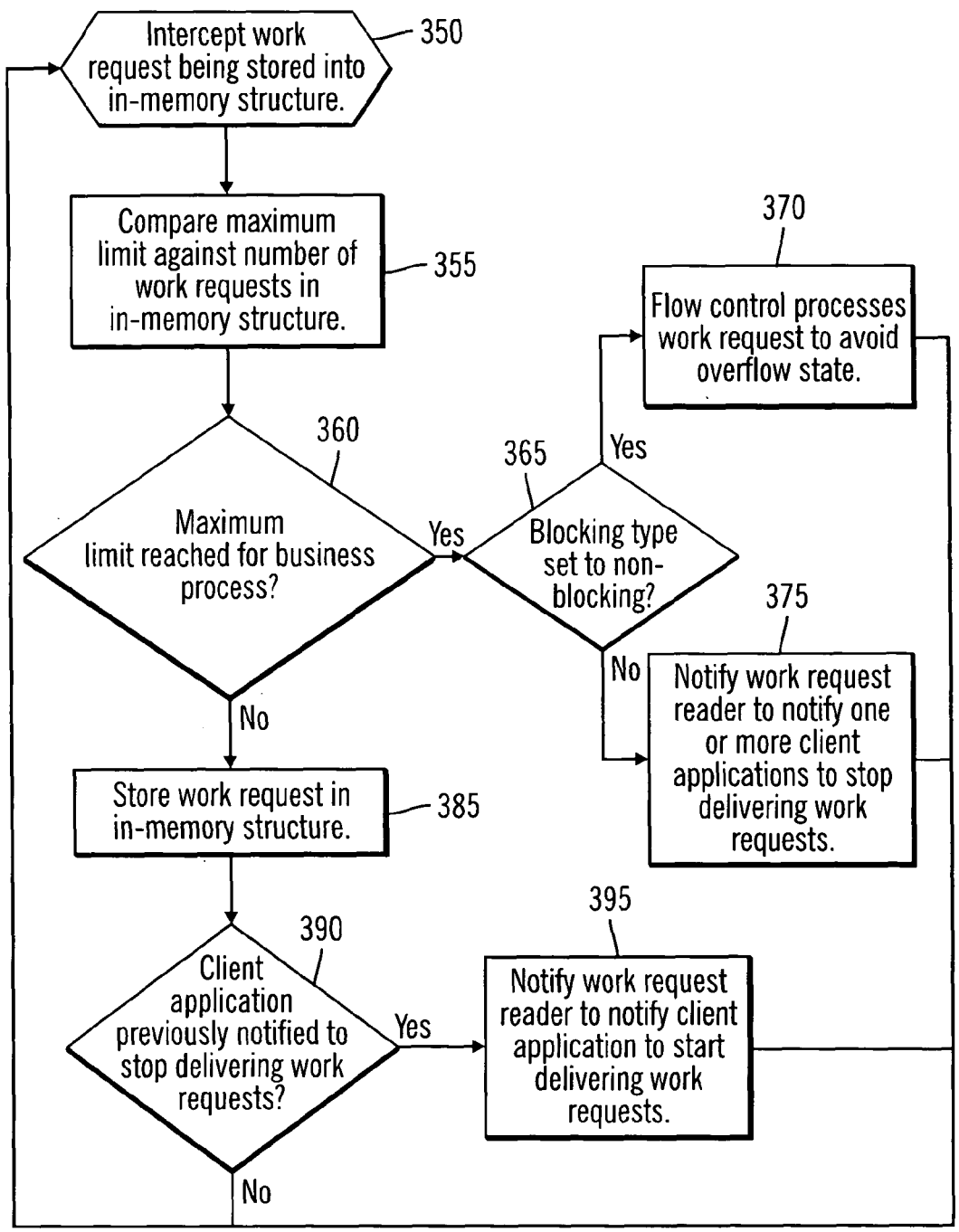
FIG. 3B illustrates logic implemented when a work request is to be processed to avoid an overflow state in accordance with certain alternative implementations of the invention.

FIG. 3B illustrates logic implemented when a work request is to be processed to avoid an overflow state in accordance with certain alternative implementations of the invention. Control begins in block 350 with the flow control component 138 "intercepting" a work request transferred by the work request reader 130 to the in-memory structure 140. In block 355, the flow control component 138 compares the maximum limit against the number of work requests in the in-memory structure 140. In block 360, if the maximum limit has been reached, processing continues to block 365, otherwise, processing continues to block 385.

In block 365, the flow control component determines whether a blocking type (e.g., flag) is set to non-blocking. If so processing continues to block 370, otherwise, processing continues to block 375. In block 370, the flow control component 138 processes the work request to avoid an overflow state (e.g., by storing the work request somewhere other than the in-memory structure 140). In block 375, the flow control component 138 notifies the work flow mover 130 to notify the client application 110a . . . 110n that sent the intercepted work request to stop sending work requests. From block 375, processing loops back to block 350. In certain implementations, a notification indicator (e.g., flag) may be set for the business processes. In this case, in block 375, the notification is sent only if the notification indicator is set to indicate that a notification is to be sent.

In block 385, the work request reader 130 stores the work request in the in-memory structure 140. In block 390, if the flow control component 138 determines that the client application 110a . . . 110n was previously notified to stop delivering work requests, processing continues to block 395, otherwise, processing loops back to block 350. In block 395, the flow control component 138 notifies the work flow mover 130 to notify one or more client applications 110a . . . 110n that were previously notified to stop sending work requests to start sending work requests. Then, processing loops back to block 350.

Thus, in certain implementations, as work requests beyond the maximum limit set for a business process 132 are received for that business process 132, if a blocking type for the in-memory structure 140 associated with the business process is set to "non-blocking," work requests are processed to avoid an overflow state for the business process 132. Thus, if one business process 132 reaches its maximum limit, then the other business processes 132 are not impacted.

Figure 4:
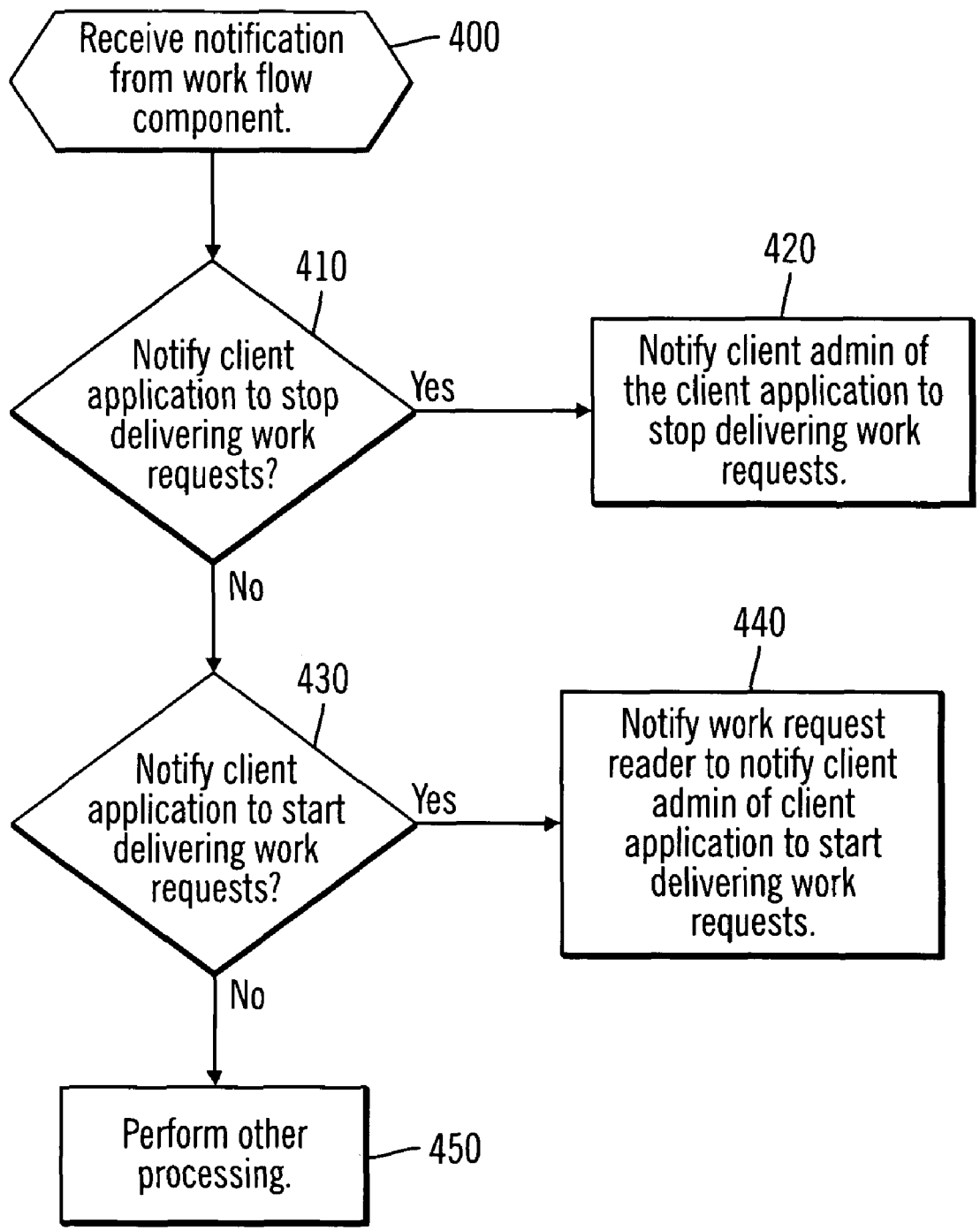
FIG. 4 illustrates logic implemented in a work request reader in accordance with certain implementations of the invention.

FIG. 4 illustrates logic implemented in a work request reader 130 in accordance with certain implementations of the invention. Control begins at block 400 with the work request reader 130 receiving a notification from the flow control component 138. In block 410, if the notification is to notify a client application 110a . . . 110n to stop delivering work requests, processing continues to block 420, otherwise, processing continues to block 430. In block 420, the work request reader 130 notifies the client admin 112a . . . 112n of the client application 110a . . . 110n to stop delivering work requests.

In block 430, if the notification is to notify a client application 110a . . . 110n to start delivering work requests, processing continues to block 440, otherwise, processing continues to block 450. In block 440, the work request reader 130 notifies the client admin 112a . . . 112n of the client application 110a . . . 110n to start delivering work requests. In block 450, other processing may occur. For example, if a notification that the work request reader 130 is not able to process is received, error processing may occur.

Thus, implementations of the invention facilitate flow control by notifying client applications 110a . . . 110n whether to stop or start sending work requests to a business process 132.

IBM, DB2, OS/390, UDB, and Informix are registered trademarks or common law marks of International Business Machines Corporation in the United States and/or other countries. JAVA® is a registered trademark or common law mark of Sun Microsystems.

Additional Implementation Details

The described techniques for facilitating flow control may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), hardware component, etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 2A, 2B, 3A, 3B, and 4 describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 2A, 2B, 3A, 3B, and 4 may be implemented in software, hardware, programmable and non-programmable gate array logic or in some combination of hardware, software, or gate array logic.

Figure 5:
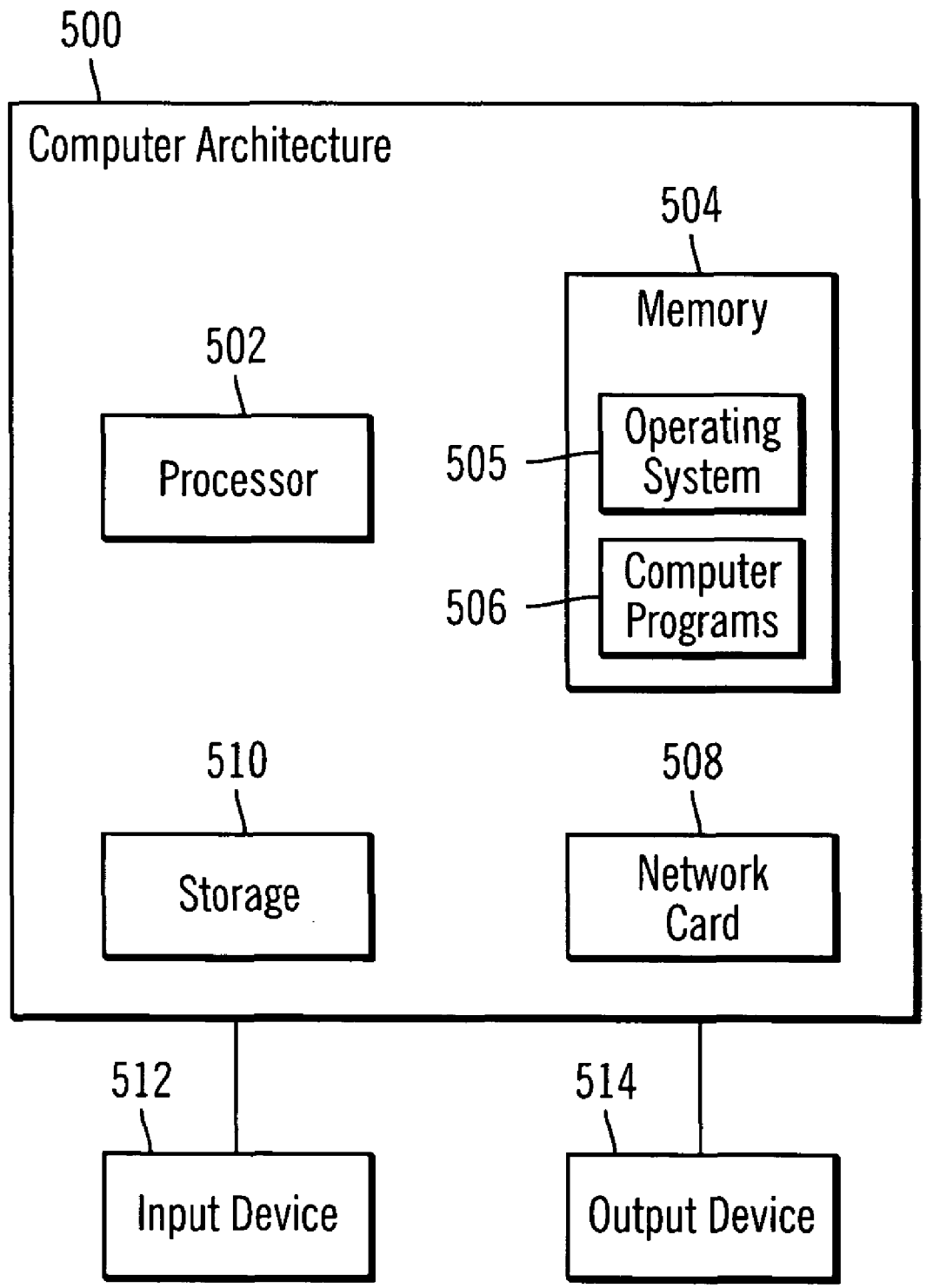
FIG. 5 illustrates an architecture of a computer system that may be used in accordance with certain implementations of the invention.

FIG. 5 illustrates an architecture 500 of a computer system that may be used in accordance with certain implementations of the invention. Client computer 100 and/or server computer 120 may implement computer architecture 500. The computer architecture 500 may implement a processor 502 (e.g., a microprocessor), a memory 504 (e.g., a volatile memory device), and storage 510 (e.g., a non-volatile storage area, such as magnetic disk drives, optical disk drives, a tape drive, etc.). An operating system 505 may execute in memory 504. The storage 510 may comprise an internal storage device or an attached or network accessible storage. Computer programs 506 in storage 510 may be loaded into the memory 504 and executed by the processor 502 in a manner known in the art. The architecture further includes a network card 508 to enable communication with a network. An input device 512 is used to provide user input to the processor 502, and may include a keyboard, mouse, pen-stylus, microphone, touch sensitive display screen, or any other activation or input mechanism known in the art. An output device 514 is capable of rendering information from the processor 502, or other component, such as a display monitor, printer, storage, etc. The computer architecture 500 of the computer systems may include fewer components than illustrated, additional components not illustrated herein, or some combination of the components illustrated and additional components.

The computer architecture 500 may comprise any computing device known in the art, such as a mainframe, server, personal computer, workstation, laptop, handheld computer, telephony device, network appliance, virtualization device, storage controller, etc. Any processor 502 and operating system 505 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for flow control between publishers and subscribers, comprising:

associating, using a server computer including a processor, a first maximum limit a with first business process;

associating a blocking type that has a value of blocking with a first in-memory structure associated with the first business process, wherein the value of blocking indicates that a client application is to be notified to stop sending additional work requests when a maximum limit is reached for the first in-memory structure;

associating a second maximum limit with a second business process;

associating a blocking type that has a value of non-blocking with a second in-memory structure associated with the second business process, and wherein the value of non-blocking indicates that the client application is not blocked from sending additional work requests when the maximum limit is reached for the second in-memory structure;

issuing, at each of multiple client computers that each include a processor and at least one client application comprising a publisher, a work request produced by a client application for the first business process or the second business process; and at the server computer including the processor, determining whether to throttle each client application by:

in response to determining that the work request is received for the second in-memory structure, comparing the second maximum limit with a number of work requests stored in the second in-memory structure;

in response to determining that the number of work requests stored in the second in-memory structure equals the second maximum limit, determining that the blocking type of the second in-memory structure is set to the value of non-blocking; and in response to determining that the blocking type is set to the value of non-blocking, storing the work request in a structure other than the second in-memory structure; and in response to determining that the work request is received for the first in-memory structure, comparing the first maximum limit with a number of work requests stored in the first in-memory structure;

in response to determining that the number of work requests stored in the first in-memory structure equals the first maximum limit, determining that the blocking type of the first in-memory structure is set to the value of blocking; and in response to determining that the blocking type is set to the value of blocking, throttling a rate of work requests issued by the client application to match a retrieval rate of the business process by sending a notification to the client application that issued the received work request that additional work requests are not to be sent.

2. The method of claim 1, further comprising:
determining that there are empty slots available in the first in-memory structure for storing new work requests in response to detecting that a work request has been transferred out of the first in-memory structure.

3. The method of claim 1, further comprising:
detecting that a work request is being transferred out of the first in-memory structure.

4. The method of claim 1, wherein the first maximum limit is a number of work requests that the first business process is configured to accept, and the second maximum limit is a number of work requests that the second business process is configured to accept.

5. The method of claim 1, further comprising:
configuring a different maximum limit for each of different business processes.

6. The method of claim 1, further comprising:
sending the notification to the client application identified in the work request.

7. The method of claim 1, further comprising:
in response to determining that the blocking type is set to the value of non-blocking, processing the work request to avoid an overflow state.

8. The method of claim 1, further comprising:
in response to determining that the number of work requests stored in the first in-memory structure does not equal the first maximum limit, that there are empty slots in the first in-memory structure, and that the notification that additional work requests are not to be sent was previously sent to the client application, sending a notification to the client application that additional work requests are to be sent.

9. An article of manufacture comprising a computer readable medium storing code for flow control between publishers and subscribers, wherein the code when executed by a processor of a computer causes operations to be performed, the operations comprising:

associating, using a server computer including a processor, a first maximum limit with a first business process;

associating a blocking type that has a value of blocking with a first in-memory structure associated with the first business process, wherein the value of blocking indicates that a client application is to be notified to stop sending additional work requests when a maximum limit is reached for the first in-memory structure;

associating a second maximum limit with a second business process;

associating a blocking type that has a value of non-blocking with a second in-memory structure associated with the second business process, and wherein the value of non-blocking indicates that the client application is not blocked from sending additional work requests when the maximum limit is reached for the second in-memory structure;

issuing, at each of multiple client computers that each include a processor and at least one client application comprising a publisher, a work request produced by a client application for the first business process or the second business process; and at the server computer including the processor, determining whether to throttle each client application by:
in response to determining that the work request is received for the second in-memory structure,
comparing the second maximum limit with a number of work requests stored in the second in-memory structure;
in response to determining that the number of work requests stored in the second in-memory structure equals the second maximum limit, determining that the blocking type of the second in-memory structure is set to the value of non-blocking; and
in response to determining that the blocking type is set to the value of non-blocking, storing the work request in a structure other than the in-memory structure; and in response to determining that the work request is received for the first in-memory structure,
comparing the first maximum limit with a number of work requests stored in the first in-memory structure;
in response to determining that the number of work requests stored in the first in-memory structure equals the first maximum limit, determining that the blocking type of the first in-memory structure is set to the value of blocking; and
in response to determining that the blocking type is set to the value of blocking, throttling a rate of work requests issued by the client application to match a retrieval rate of the business process by sending a notification to the client application that issued the received work request that additional work requests are not to be sent.

10. The article of manufacture of claim 9, wherein the operations further comprise:
determining that there are empty slots available in the first in-memory structure for storing new work requests in response to detecting that a work request has been transferred out of the first in-memory structure.

11. The article of manufacture of claim 9, wherein the operations further comprise:
detecting that a work request is being transferred out of the first in-memory structure.

12. The article of manufacture of claim 9, wherein the first maximum limit is a number of work requests that the first business process is configured to accept, and the second maximum limit is a number of work requests that the second business process is configured to accept.

13. The article of manufacture of claim 9, wherein the operations further comprise:
configuring a different maximum limit for each of different business processes.

14. The article of manufacture of claim 9, wherein the operations further comprise:
sending the notification to the client application identified in the work request.

15. The article of manufacture of claim 9, further comprising:
in response to determining that the blocking type is set to the value of non-blocking, processing the work request to avoid an overflow state.

16. The article of manufacture of claim 9, further comprising:
in response to determining that the number of work requests stored in the first in-memory structure does not equal the first maximum limit, that there are empty slots in the first in-memory structure, and that the notification that additional work requests are not to be sent was previously sent to the client application, sending a notification to the client application that additional work requests are to be sent.

17. A computer system for flow control between publishers and subscribers, comprising:
a processor; and
storage coupled to the processor, wherein the storage has stored thereon a program, and wherein the processor is configured to execute the program to perform operations, wherein the operations comprise:
associating, using a server computer including a processor, a first maximum limit with a first business process;
associating a blocking type that has a value of blocking with a first in-memory structure associated with the first business process, with a first in-memory structure associated with the first business process, wherein the value of blocking indicates that a client application is to be notified to stop sending additional work requests when a maximum limit is reached for the first in-memory structure;
associating a second maximum limit with a second business process;
associating a blocking type that has a value of non-blocking with a second in-memory structure associated with the second business process, and wherein the value of non-blocking indicates that the client application is not blocked from sending additional work requests when the maximum limit is reached for the second in-memory structure;
issuing, at each of multiple client computers that each include a processor and at least one client application comprising a publisher, a work request produced by a client application for the first business process or the second business process; and
at the server computer including the processor, determining whether to throttle each client application by:
in response to determining that the work request is received for the second in-memory structure,
comparing the second maximum limit with a number of work requests stored in the second in-memory structure;
in response to determining that the number of work requests stored in the second in-memory structure equals the second maximum limit, determining that the blocking type of the second in-memory structure is set to the value of non-blocking; and
in response to determining that the blocking type is set to the value of non-blocking, storing the work request in a structure other than the second in-memory structure; and
in response to determining that the work request is received for the first in-memory structure,
comparing the first maximum limit with a number of work requests stored in the first in-memory structure;
in response to determining that the number of work requests stored in the first in-memory structure equals the first maximum limit, determining that the blocking type of the first in-memory structure is set to the value of blocking; and
in response to determining that the blocking type is set to the value of blocking, throttling a rate of work requests issued by the client application to match a retrieval rate of the business process by sending a notification to the client application that issued the received work request that additional work requests are not to be sent.

18. The computer system of claim 17, further comprising:
determining that there are empty slots available in the first in-memory structure for storing new work requests in response to detecting that a work request has been transferred out of the first in-memory structure.

19. The computer system of claim 17, further comprising:
detecting that a work request is being transferred out of the first in-memory structure.

20. The computer system of claim 17, wherein the first maximum limit is a number of work requests that the first business process is configured to accept, and the second maximum limit is a number of work requests that the second business process is configured to accept.

21. The computer system of claim 17, further comprising:
configuring a different maximum limit for each of different business processes.

22. The computer system of claim 17, further comprising:
sending the notification to the client application identified in the work request.

23. The computer system of claim 17, further comprising:
in response to determining that the blocking type is set to the value of non-blocking, processing the work request to avoid an overflow state.

24. The computer system of claim 17, further comprising:
in response to determining that the number of work requests stored in the first in-memory structure does not equal the first maximum limit, that there are empty slots in the first in-memory structure, and that the notification that additional work requests are not to be sent was previously sent to the client application, sending a notification to the client application that additional work requests are to be sent.

* * * * *